(12) United States Patent
Seigler

(10) Patent No.: US 7,944,781 B2
(45) Date of Patent: May 17, 2011

(54) FLEXIBLE WAVEGUIDE WITH ADJUSTABLE INDEX OF REFRACTION

(75) Inventor: Michael Allen Seigler, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 760 days.

(21) Appl. No.: 11/872,868

(22) Filed: Oct. 16, 2007

(65) Prior Publication Data

US 2009/0257324 A1   Oct. 15, 2009

(51) Int. Cl.
*G11B 11/00* (2006.01)
(52) U.S. Cl. .............. 369/13.32; 369/13.33; 369/112.27
(58) Field of Classification Search ............... 369/13.02, 369/13.33, 13.32, 112.27; 385/129, 50, 42, 385/147, 14, 131, 143, 37, 43; 264/1.21, 264/1.1
See application file for complete search history.

(56) References Cited

U.S. PATENT DOCUMENTS

| 5,739,948 | A | 4/1998 | Kushibiki et al. |
| 6,788,874 | B1 | 9/2004 | Ishikawa et al. |
| 6,905,904 | B2 | 6/2005 | Gardner et al. |
| 6,907,176 | B2 | 6/2005 | Gardner et al. |
| 7,215,457 | B1 | 5/2007 | Westfall et al. |
| 7,330,404 | B2 * | 2/2008 | Peng et al. ................. 369/13.33 |
| 2004/0067033 | A1 * | 4/2004 | Aylward et al. ............... 385/124 |

* cited by examiner

*Primary Examiner* — Ali Neyzari
(74) *Attorney, Agent, or Firm* — Robert P. Lenart, Esq.; Pietragallo Gordon Alfano Bosick & Raspanti, LLP

(57) ABSTRACT

A flexible waveguide with an adjustable index of refraction. The core layer and/or the cladding layer of a flexible waveguide may include a plurality of nanoparticles having a different index of refraction than the core layer and/or cladding layer. The plurality of nanoparticles may have an index of refraction that is greater than or less than an index of refraction of either the core layer or the cladding layer in order that the overall effective index of refraction of either the core layer or the cladding layer can be adjusted.

12 Claims, 5 Drawing Sheets

FLEXIBLE WAVEGUIDE WITH ADJUSTABLE INDEX OF REFRACTION

BACKGROUND

A flexible waveguide is an optical component that can provide for directing or guiding an electromagnetic wave in a generally non-linear direction. Data storage systems often incorporate optical components to assist in the recording of information. Such systems may include, for example, optical recording systems, magneto-optical recording systems or other thermal assisted type recording systems. There is an increased emphasis on improving the areal densities of data storage systems. Thus, all components of data storage systems are being improved and new components are being incorporated into data storage systems to achieve higher areal densities.

SUMMARY

An aspect of the present invention is to provide a flexible waveguide having a core layer and a plurality of nanoparticles contained in the core layer. The core layer has a core material with a first index of refraction. Each of the nanoparticles has a second index of refraction that is greater than the first index of refraction of the core material.

Another aspect of the present invention is to provide an apparatus including a core layer structured and arranged to direct an electromagnetic wave in a generally nonlinear direction and a plurality of nanoparticles contained in the core layer. The core layer has a core material with a first index of refraction. Each of the nanoparticles has a second index of refraction that is different than the first index of refraction of the core material. The first index of refraction may be less than the second index of refraction, or the first index of refraction may be greater than the second index of refraction.

A further aspect of the present invention is to provide an apparatus including a cladding layer generally disposed about a core layer and a plurality of nanoparticles contained in the cladding layer. The cladding layer has a cladding material with a first index of refraction. Each of the nanoparticles has a second index of refraction that is different than the first index of refraction of the cladding material. The first index of refraction may be less than the second index of refraction, or the first index of refraction may be greater than the second index of refraction.

An additional aspect of the present invention is to provide a data storage system including means for storing data, means for reading and/or writing data in association with the means for storing data, and a flexible waveguide for directing an electromagnetic wave to the means for reading and/or writing data. The flexible waveguide includes a core layer and means for adjusting the effective index of refraction of the core layer.

These and various other features and advantages will be apparent from a reading of the following detailed description.

DRAWINGS

DETAILED DESCRIPTION

Figure 1:
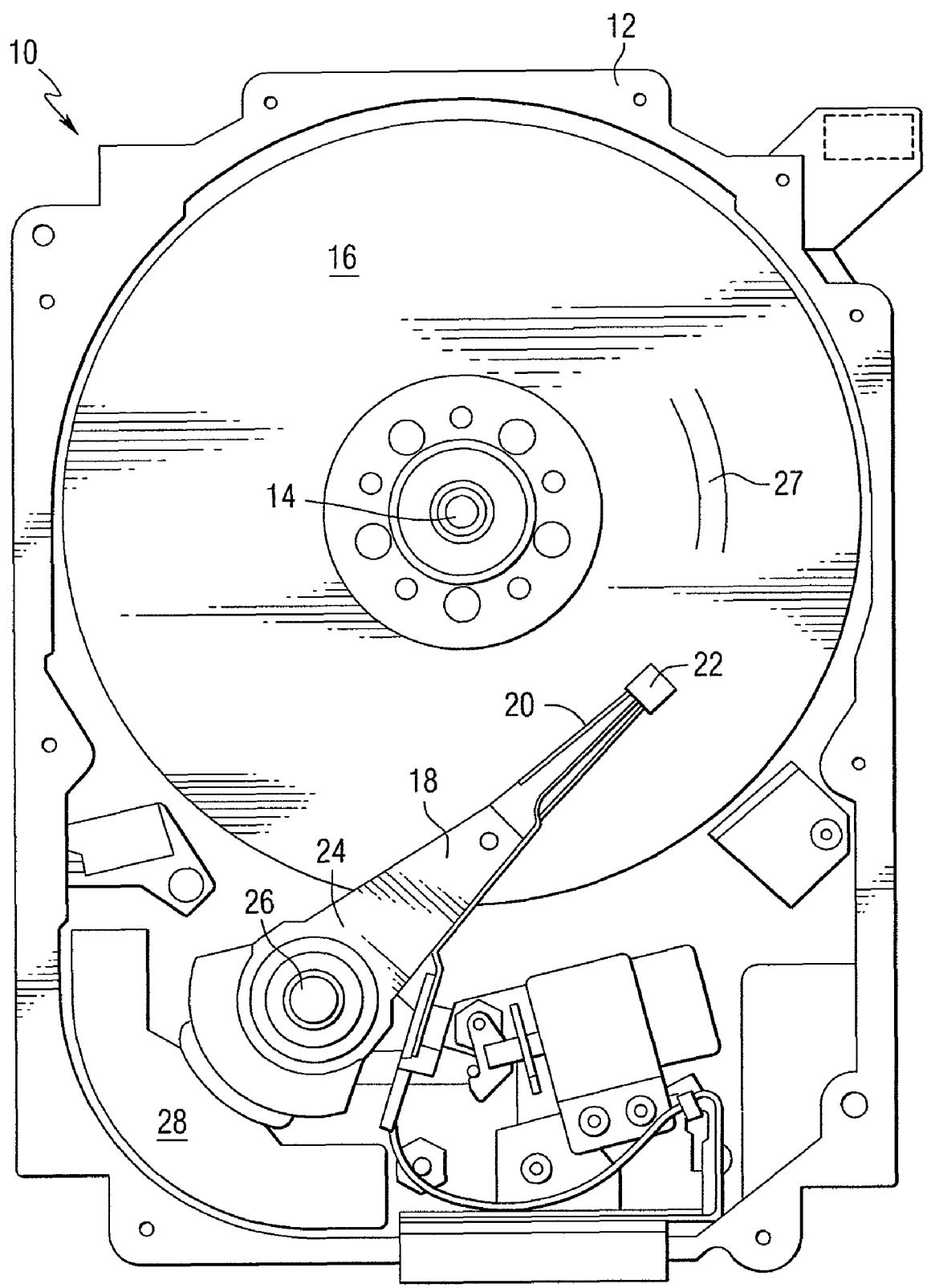
FIG. 1 is a pictorial representation of a system, in accordance with an aspect of the invention.

FIG. 1 is a pictorial representation of a system 10 that can include aspects of this invention. The system 10 includes a housing 12 (with the upper portion removed and the lower portion visible in this view) sized and configured to contain the various components of the system 10. The system 10 includes a spindle motor 14 for rotating at least one disc 16 within the housing 12. At least one actuator arm 18 is contained within the housing 12, with each arm 18 having a first end 20 with a slider 22, and a second end 24 pivotally mounted on a shaft by a bearing 26. An actuator motor 28 is located at the arm's second end 24 for pivoting the arm 18 to position the slider 22 over a desired sector 27 of the disc 16. The actuator motor 28 is regulated by a controller, which is not shown in this view and is well known in the art.

Figure 2:
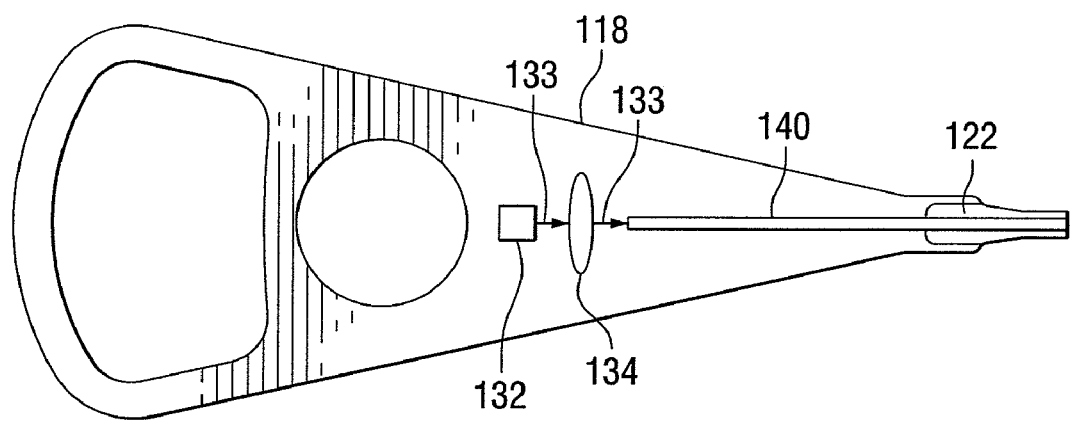
FIG. 2 is a plan view of an actuator arm, in accordance with an aspect of the invention.

FIG. 2 is a plan view of an actuator arm 118 having a laser module 132 mounted thereon, in accordance with an aspect of the invention. The laser module 132 directs an electromagnetic wave 133 to a flexible waveguide 140. An optical component such as, for example, a lens 134, may be positioned between the laser module 132 and the waveguide 140 to focus the wave 133. The flexible waveguide 140 is used to conduct the electromagnetic wave 133 from the laser module 132 to a slider 122. From the flexible waveguide 140, the electromagnetic wave 133 can be coupled into a waveguide on the slider 122 and directed onto an adjacent data storage medium (see FIG. 9).

Figure 3:
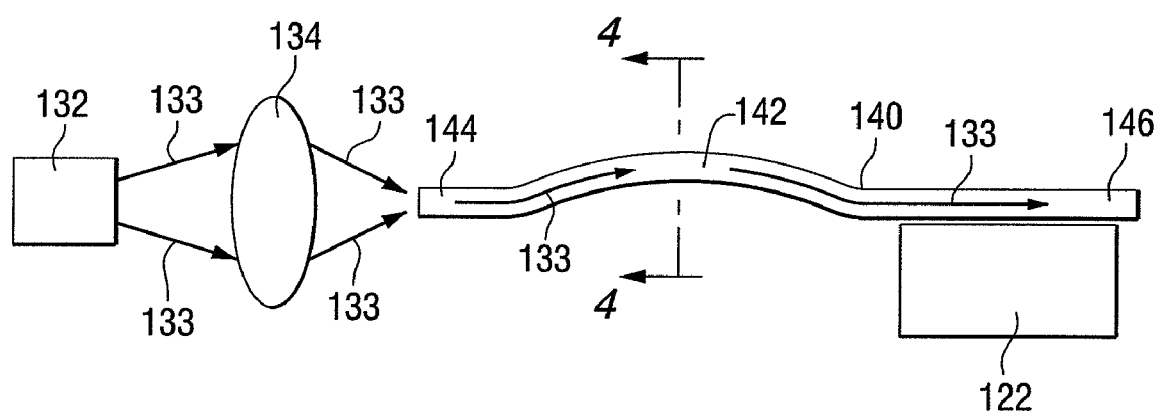
FIG. 3 is partial side schematic view of FIG. 2, in accordance with an aspect of the invention.

FIG. 3 is partial side schematic view of FIG. 2 with the actuator arm 118 not shown for simplification of illustration. FIG. 3 illustrates that at least a portion of the flexible waveguide 140 is non-linear for conducting the electromagnetic wave 133 therethrough in a generally non-linear direction. Specifically, a portion 142 of the flexible waveguide 140 between a first end 144 and a second end 146 of the flexible waveguide 140 can have a curvature for conducting the electromagnetic wave 133 therethrough in a generally non-linear direction. It will be appreciated that the flexible waveguide 140 can have various portions thereof capable of non-linear conduction of the wave 133.

Figure 4:
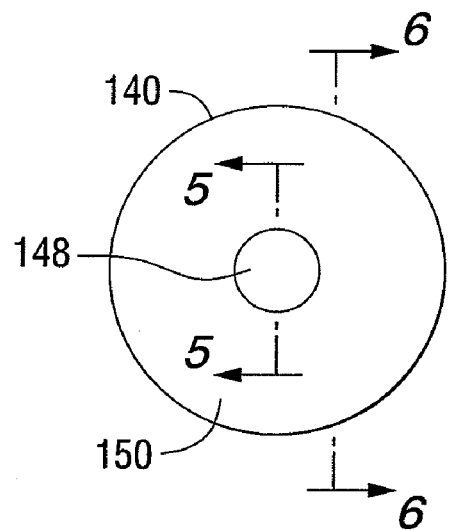
FIG. 4 is a schematic cross-sectional view taken along line 4-4 of FIG. 3.

FIG. 4 is a schematic cross-sectional view taken along line 4-4 of FIG. 3. As shown, the flexible waveguide 140 has a core layer 148 and a cladding layer 150 disposed at least partially about the core layer 148.

Figure 5:
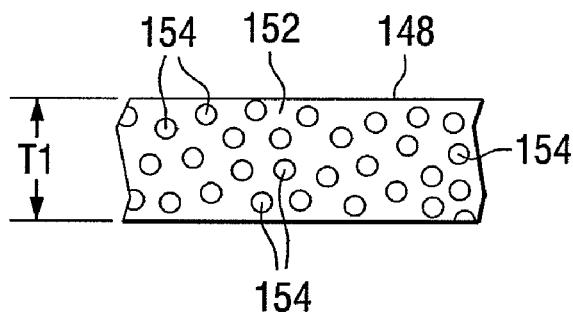
FIG. 5 is a schematic cross-sectional view taken along line 5-5 of FIG. 4.

FIG. 5 is a schematic cross-sectional view taken along line 5-5 of FIG. 4. Specifically, the core layer 148 includes a core material 152 and a plurality of nanoparticles 154 dispersed throughout the core material 152. The core material 152 has an index of refraction that may be in the range of about 1.2 to about 1.8. The core material 152 may be formed of, for example, polymethylmethacrylate, polystyrene, polycarbonate, or silicone polymers such as polysiloxanes or siloxanes. Each nanoparticle 154 may have an index of refraction that is in the range of about 1.5 to about 3.5. The nanoparticles 154 may be formed of at least one of diamond like carbon, $Ta_2O_5$, $TiO_2$, SiN, $HfO_2$, $ZrO_2$, AlN or $Al_2O_3$. In accordance with an aspect of the invention, the index of refraction of the nanoparticles 154 is greater than the index of refraction of the core material 152. By dispersing the nanoparticles 154 in the core material 152, the overall effective index of refraction of the core layer 148 can be increased. For example, the overall effective index of refraction of the core layer 148 may be in the range of about 1.2 to about 3.5. However, it will be appreciated that in accordance with an aspect of the invention nanoparticles having an index of refraction that is less than an index of refraction of a core layer material may be dispersed in the core layer material to decrease the overall effective index of refraction of the core layer.

The core layer 148 may, for example, have a thickness T1 in the range of about 100 nm to about 1 mm. In one aspect, the nanoparticles 154 may each have a diameter that is less than about 80 nm. In another aspect, the nanoparticles 154 may each have a diameter that is less than about one-tenth of the wavelength of the electromagnetic wave 133 that will propagate through the flexible waveguide 140.

Figure 6:
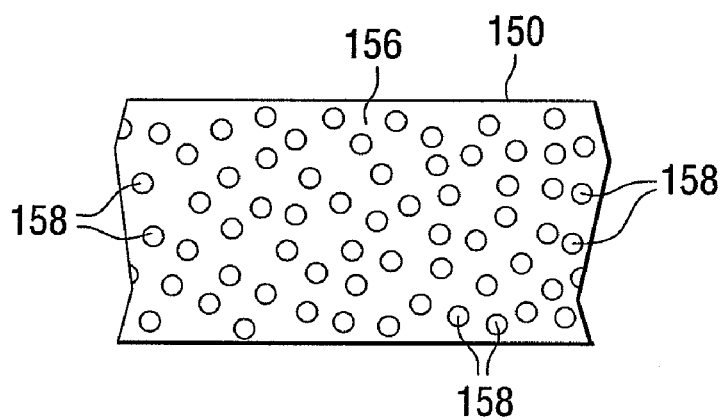
FIG. 6 is a schematic cross-sectional view taken along line 6-6 of FIG. 4.

FIG. 6 is a schematic cross-sectional view taken along line 6-6 of FIG. 4. Specifically, FIG. 6 shows the cladding layer 150 that is formed of a cladding material 156 and a plurality of nanoparticles 158 that are dispersed in the cladding material 156. The cladding material 156 may be, for example, polymethylmethacrylate, polystyrene, polycarbonate, or silicone polymers such as polysiloxanes or siloxanes. The cladding material 156 may have an index of refraction in the range of about 1.2 to about 1.8. The plurality of nanoparticles 158 may be each formed of, for example, diamond like carbon, $Ta_2O_5$, $TiO_2$, SiN, $HfO_2$, $ZrO_2$, AlN or $Al_2O_3$. Each nanoparticle 158 may have an index of refraction in the range of about 1.5 to about 3.5.

In one aspect of the invention, the index of refraction of each nanoparticle 158 is greater than the index of refraction of the cladding material 156. This provides for dispersing the nanoparticles 158 in the cladding material 156 so as to increase the overall effective index of refraction of the cladding layer 150. For example, the effective index of refraction of the cladding layer 150 may be in the range of about 1.2 to about 3.5. However, it will be appreciated that in accordance with an aspect of the invention nanoparticles having an index of refraction that is less than an index of refraction of a cladding layer material may be dispersed in the cladding layer material to decrease the overall effective index of refraction of the cladding layer.

Figure 7:
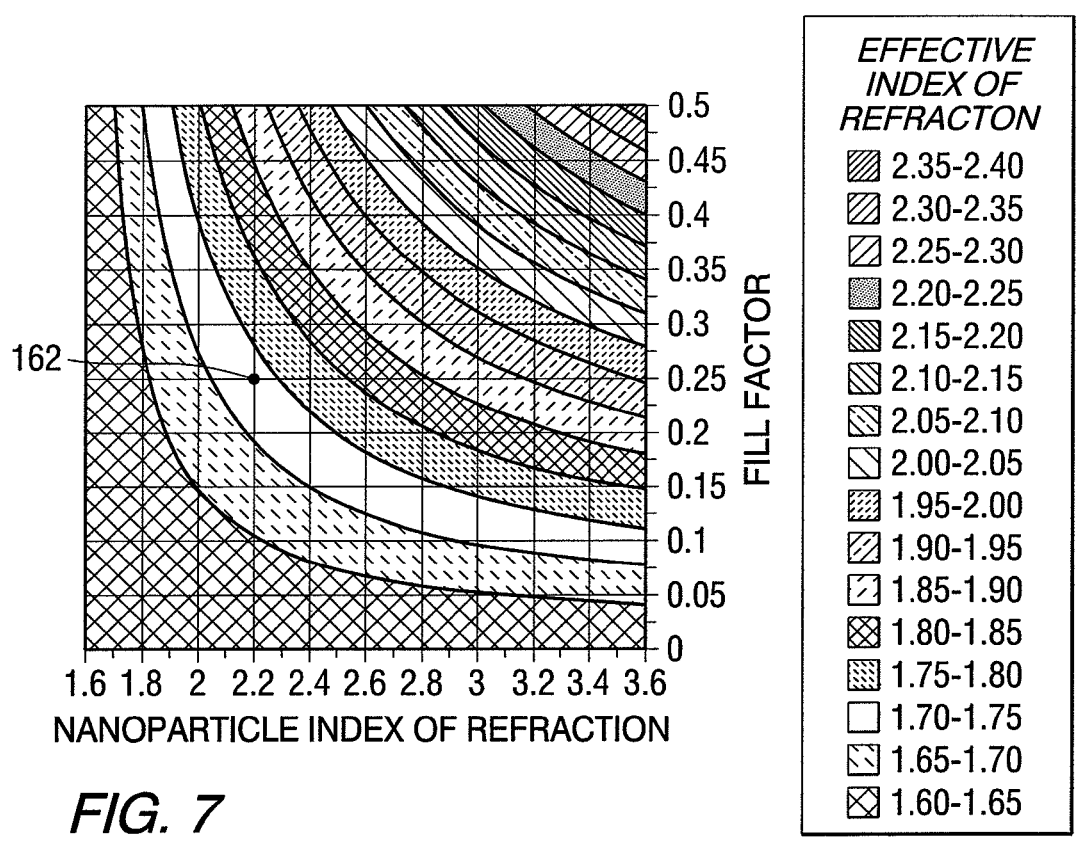
FIG. 7 is a graphical illustration of effective index of refraction.

FIG. 7 graphically illustrates the effective index of refraction for a cladding layer, such as cladding layer 150, versus the index of refraction of nanoparticles, such as nanoparticles 158, that are dispersed in a cladding material, such as cladding material 156, having an index of refraction of about 1.60 for a corresponding fill factor that represents the percentage of particles contained within the cladding material. For example, for a cladding material having the index of refraction of about 1.60 with a 25% fill factor of nanoparticles having an index of refraction of 2.2, the effective index of refraction would be about 1.70 to about 1.75 (see the point labeled with reference number 162 in FIG. 7).

Figure 8:
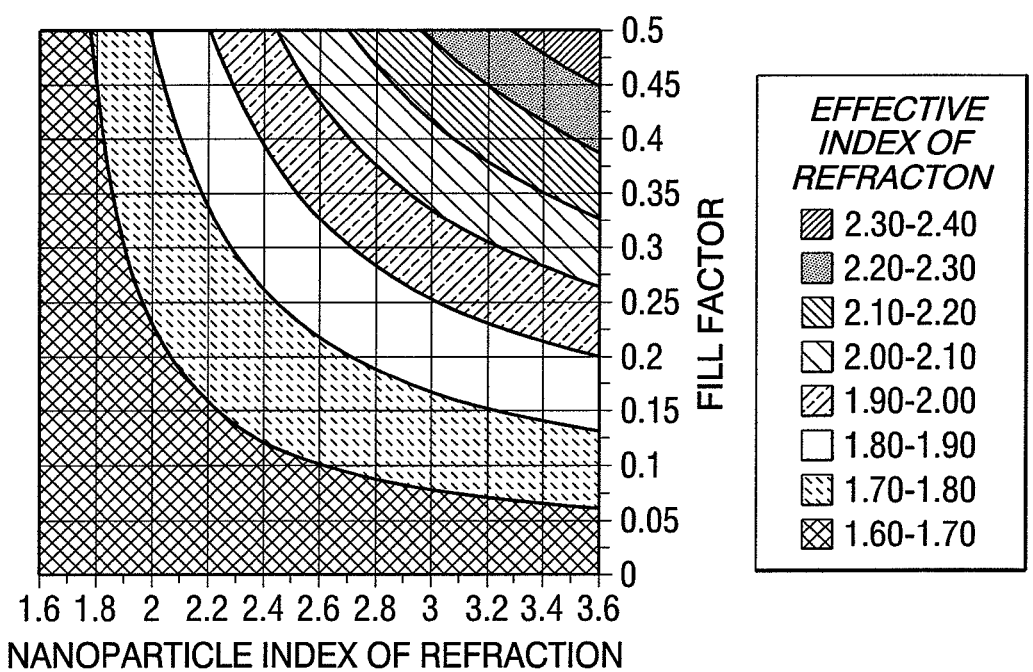
FIG. 8 is a graphical illustration of effective index of refraction.

FIG. 8 shows a graphical illustration similar to FIG. 7, but for a core layer such as, for example, core layer 148, having a core material such as, for example, core material 152, with an index of refraction of about 1.62.

Figure 9:
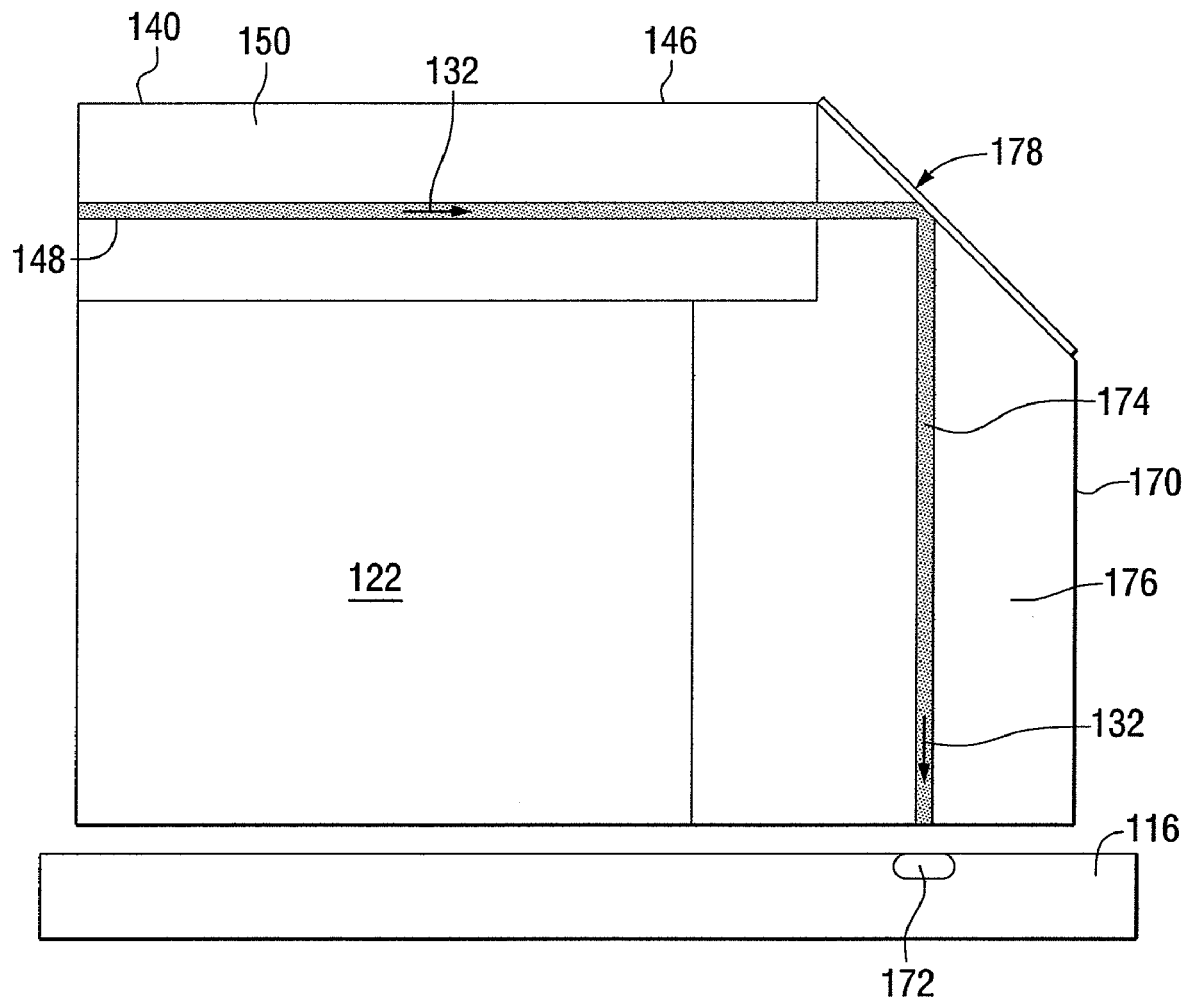
FIG. 9 is a partial schematic representation of a slider with a flexible waveguide and an additional waveguide, in accordance with an aspect of the invention.

FIG. 9 is a partial schematic representation of the slider 122 with the flexible waveguide 140, and particularly the second end 146 thereof, positioned adjacent to a surface of the slider 122. The slider 122 further includes an additional waveguide, generally represented by reference number 170, adjacent another surface of the slider 122. The waveguide 170 may be used, for example, in association with a data storage device for generating an optical spot 172 on the surface of a data storage media 116. Such arrangements are useful, for example, in a thermal assisted or heat assisted data storage system. The waveguide 170 includes a core layer 174 and a cladding layer 176 disposed thereabout. A turning mirror 178 may be provided for reflecting the electromagnetic wave 132 that is being transmitted through the core layer 148 of the flexible waveguide 140 such that the electromagnetic wave 132 is coupled into the core layer 174 of the planar waveguide 170. In accordance with an aspect of the invention, the ability to increase or decrease the index of refraction for a waveguide, such as, for example, the flexible waveguide 140, results in the ability to better match the mode index with another waveguide, such as, for example, planar waveguide 170, so as to have increased coupling efficiency therebetween.

The implementation described above and other implementations are within the scope of the following claims.

What is claimed is:

1. A flexible waveguide, comprising:
   a core layer having a core material with a first index of refraction; and
   a plurality of nanoparticles contained in the core layer, each of the nanoparticles having a second index of refraction that is greater than the first index of refraction of the core material.

2. The flexible waveguide of claim 1, wherein the first index of refraction is in the range of about 1.2 to about 1.8.

3. The flexible waveguide of claim 1, wherein the second index of refraction is in the range of about 1.5 to about 3.5.

4. The flexible waveguide of claim 1, wherein the plurality of nanoparticles include at least one of diamond like carbon, $Ta_2O_5$, $TiO_2$, SiN, $HfO_2$, $ZrO_2$, AlN or $Al_2O_3$.

5. The flexible waveguide of claim 1, wherein the core layer has a thickness in the range of about 100 nm to about 1 mm.

6. The flexible waveguide of claim 1, further including a cladding layer generally disposed about the core layer and an additional plurality of nanoparticles contained in the cladding layer, the cladding layer having a cladding material with a third index of refraction that is less than a fourth index of refraction of each of the nanoparticles.

7. The flexible waveguide of claim 6, wherein the third index of refraction is in the range of about 1.2 to about 1.8 and the fourth index of refraction is in the range of about 1.5 to about 3.5.

8. The flexible waveguide of claim 1, wherein the core layer has an effective index of refraction in the range of about 1.2 to about 3.5.

9. The flexible waveguide of claim 1, wherein the cladding layer has an effective index of refraction in the range of about 1.2 to about 3.5.

10. An apparatus, comprising:
    a core layer structured and arranged to direct an electromagnetic wave in a generally non-linear direction, the core layer having a core material with a first index of refraction; and
    a plurality of nanoparticles contained in the core layer, each of the nanoparticles having a second index of refraction that is different than the first index of refraction of the core material.

11. The apparatus of claim 10, wherein the first index of refraction is less than the second index of refraction.

12. The apparatus of claim 10, wherein the first index of refraction is greater than the second index of refraction.

* * * * *